United States Patent
Kruska et al.

(10) Patent No.: US 10,172,345 B2
(45) Date of Patent: Jan. 8, 2019

(54) PORTABLE GROUND BLIND

(71) Applicant: Hunters Specialties, Inc., Cedar Rapids, IA (US)

(72) Inventors: Jesse Kruska, Wallingford, CT (US); Scott H. Smith, Hartford, CT (US); David Mathieu, Colchester, CT (US); James T. Sener, Glastonbury, CT (US)

(73) Assignee: HUNTER'S SPECIALTIES, INC., Cedar Rapids, IA (US)

( * ) Notice: Subject to any disclaimer, the term of this patent is extended or adjusted under 35 U.S.C. 154(b) by 110 days.

(21) Appl. No.: 15/259,960

(22) Filed: Sep. 8, 2016

(65) Prior Publication Data
US 2018/0064096 A1 Mar. 8, 2018

(51) Int. Cl.
*A01M 31/02* (2006.01)
*F16M 13/00* (2006.01)

(52) U.S. Cl.
CPC .......... *A01M 31/025* (2013.01); *F16M 13/00* (2013.01)

(58) Field of Classification Search
CPC .................................................. A01M 31/025
See application file for complete search history.

(56) References Cited

U.S. PATENT DOCUMENTS

| | | | |
|---|---|---|---|
| 5,930,932 A * | 8/1999 | Peterson | F41A 23/16 42/94 |
| 5,930,933 A * | 8/1999 | Schleicher | F41A 23/16 42/94 |
| 2007/0119441 A1 * | 5/2007 | Niemackl | F41B 5/14 124/86 |
| 2009/0065039 A1 * | 3/2009 | Livacich | E04H 15/001 135/123 |
| 2010/0116442 A1 * | 5/2010 | Pottmeyer | A01M 31/025 160/136 |
| 2010/0154282 A1 * | 6/2010 | Lau | A01M 31/025 43/1 |
| 2013/0174826 A1 * | 7/2013 | Faherty | F41B 5/1496 124/88 |
| 2014/0013645 A1 * | 1/2014 | Sargent | F41A 23/02 42/94 |
| 2014/0020726 A1 * | 1/2014 | Nolz | F41A 23/14 135/144 |
| 2014/0150835 A1 * | 6/2014 | Heilman | A01M 31/025 135/90 |
| 2014/0150836 A1 * | 6/2014 | Bourland | E04H 15/001 135/96 |

(Continued)

*Primary Examiner* — Christopher P Ellis
(74) *Attorney, Agent, or Firm* — Conley Rose PC

(57) ABSTRACT

A portable ground blind device having a sheet of material combined with a frame assembly. The frame assembly includes a connector member pivotally combined with one or more leg support members for supporting the device on the ground surface and one or more arm members for supporting a top portion of the sheet. The sheet may include sleeves or casings adapted to receive portions of the support members and arm members to combine the sheet with the frame. The sheet covers the leg support members to form a three dimensional covered pocket under the frame. The arm members may include pivot joints for adjusting a first arm member portion relative to a second arm member portion, each portion can be separately adjusted relative to the frame assembly. A gun rest is adjustably combined with the connector member.

21 Claims, 11 Drawing Sheets

(56) References Cited

U.S. PATENT DOCUMENTS

| | | | |
|---|---|---|---|
| 2014/0182448 A1* | 7/2014 | Jantzen | E04H 15/04 89/36.01 |
| 2015/0250162 A1* | 9/2015 | Wyant | E04H 15/001 135/147 |
| 2017/0009803 A1* | 1/2017 | Parsons | E04H 15/48 |

* cited by examiner

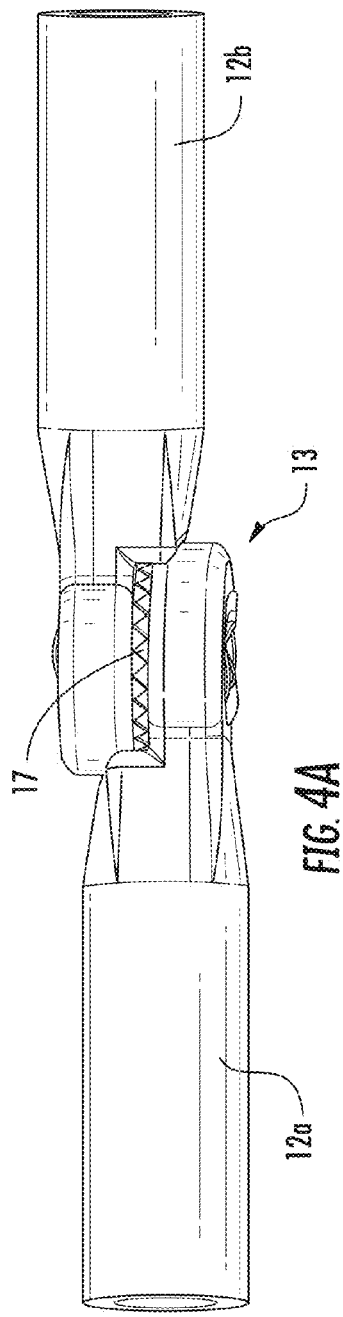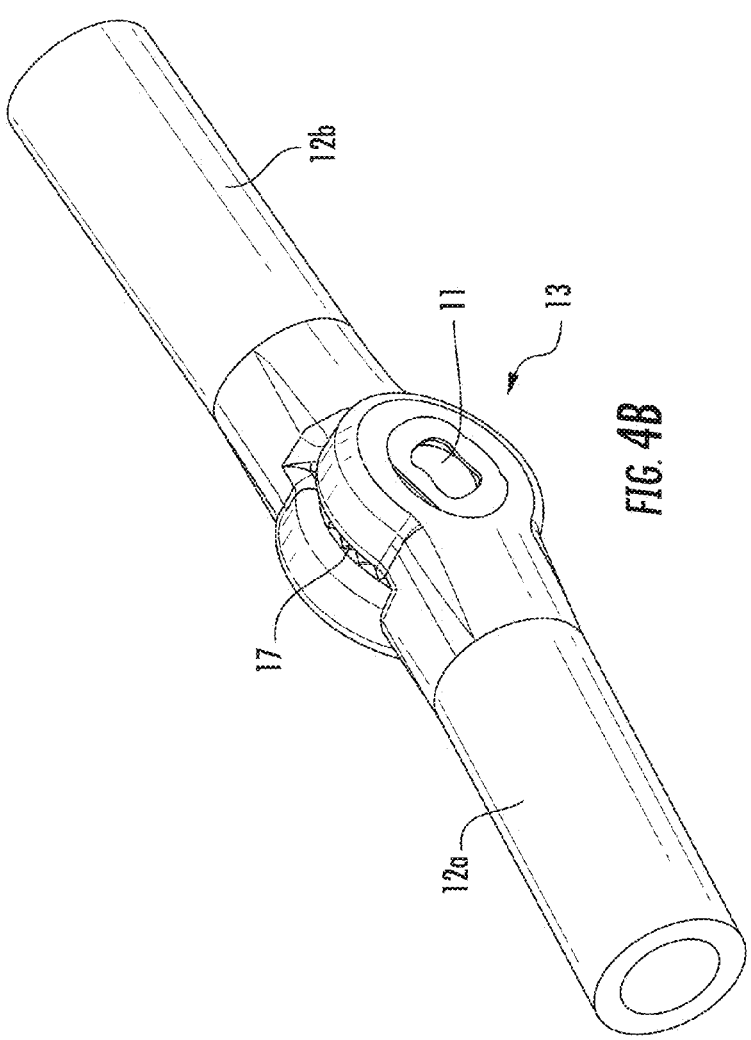

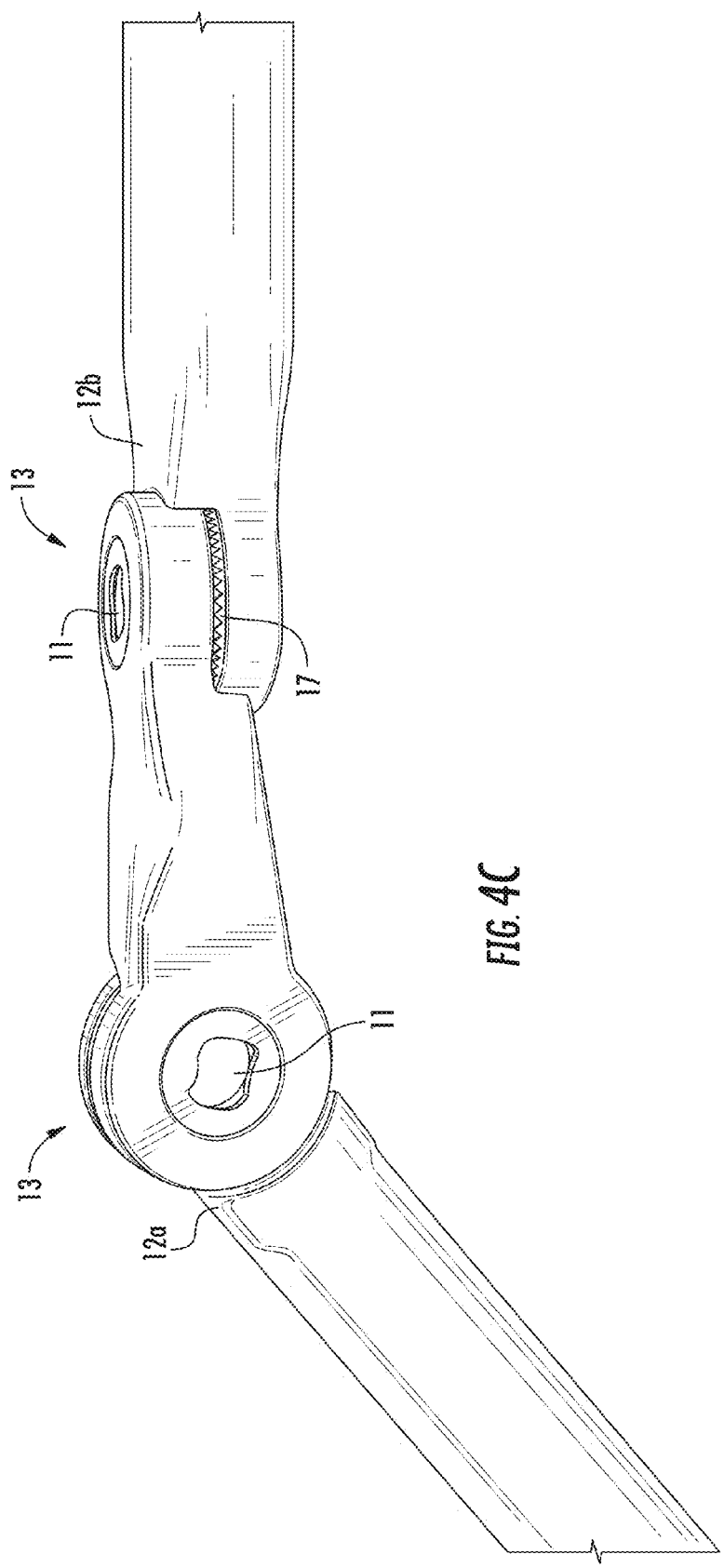

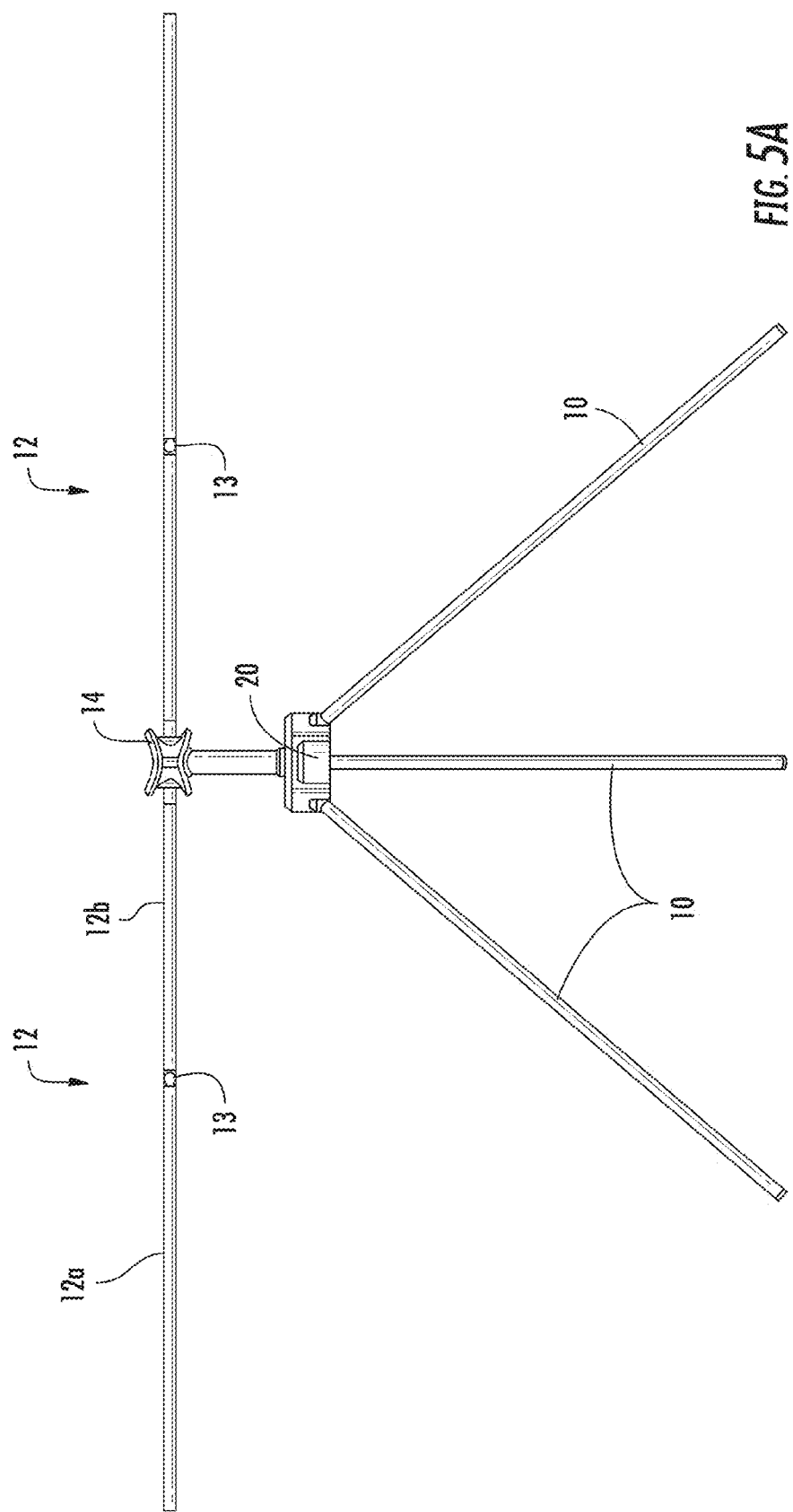

PORTABLE GROUND BLIND

BACKGROUND

This invention relates to a portable hunting blind and method of using the same.

Hunters and wildlife enthusiasts have known for many years that concealing themselves from wildlife allows them an opportunity to have the wildlife come much closer to them without being spooked away. Thus, the use of blinds for hunters, wildlife photographers, and outdoor enthusiasts is well-known in the art. Many types of blinds have been used over the years. For example, permanent blinds can be set up in a location known to have the desired wildlife and used for concealing oneself inside. Portable blinds have been used over the years to temporarily set up on a location where the desired wildlife is likely to be.

One existing type of portable bind is a generally flat sheet of fabric mounted to a collapsible frame. The fabric sheet forms a two-dimensional wall between the user and the wildlife. One problem with this type of blind is that the user is only concealed from the wildlife if the wildlife is directly in front of the blind. In other words, the user can be seen around the edges of the sheet as the wildlife walks past the user.

Another problem with existing portable blinds is that they can be relatively large and heavy. Yet another problem with temporary blinds is that they tend to be cumbersome and difficult to set up in the field. Yet another problem is that they are not adjustable which makes them difficult to see, shoot, or photograph out of. Thus, it is desirable to have an improved portable hunting blind which addresses these and other problems.

SUMMARY

One aspect of the invention includes a portable ground blind device having a sheet of material covering a frame assembly. The frame assembly includes a connector member, one or more leg support members, and one or more adjustable arm members. The one or more leg support members are pivotally combined with a first portion of the connector member for supporting the device on the ground surface. The one or more arm members are pivotally combined with a second portion of the connector member for adjustably supporting a top portion of the sheet. The sheet may include sleeves or casings adapted to receive portions of the support members and the arm members to attach the sheet to the frame. The arm members may include one or more joints for adjusting a first arm member portion relative to a second arm member portion so that each arm member portion can be separately adjusted relative to the rest of the frame assembly. The sheet may be combined with each of the arm member portions to allow the sheet to be positioned in many different configurations. The connector member may include or be combined with a gun rest. The gun rest may be adjustably combined with the rest of the connector member to adjust its elevation upward or downward relative to the rest of the frame.

Another aspect of the invention includes a portable ground blind device having a sheet of material covering a frame assembly. The frame assembly includes a connector member, at least three leg support members, and one or more adjustable arm members. A first portion of the connector member is pivotally combined with the at least three leg support members for supporting the device on the ground surface. The leg support members form a tripod or other non-planar support structure when they are pivoted from their retracted position to their extended position. The one or more arm members are pivotally combined with a second portion of connector member for adjustably supporting a top portion of the sheet. The sheet may include sleeves or casings adapted to receive portions of the support members and arm members to attach the sheet to the frame. The sheet is combined with at least three of the leg support members to create a three dimensional shape around the extended non-planer leg support members. The arm members may include one or more joints for adjusting a first arm member portion relative to a second arm member portion so that each arm member portion can be separately adjusted relative to the frame assembly. The connector member may include or be combined with a gun rest. The gun rest may be adjustably combined with the rest of the connector member to adjust its elevation upward or downward relative to the rest of the frame assembly.

Another aspect of the invention includes a method of using the portable ground blind device described above. The method includes pivoting the support members outward to form a stable non-planar support for the device. In some embodiments the support members may form a tripod. The support members and arm members are inserted into sleeves or casings in the sheet to attach the frame to the sheet. The arms are adjusted to the desired position then the user positions himself/herself behind the blind.

BRIEF DESCRIPTION OF THE DRAWINGS

FIG. 4*a* is a top view of an embodiment of the pivotal connection between two adjoining adjustable arm members.

FIG. 4*b* is a perspective view of the pivotal connection shown in FIG. 4*a*.

FIG. 4*c* is a perspective view of an embodiment having two pivotal connections spaced apart and positioned to pivot around a different axis.

FIG. 5*a* is an elevational view of an embodiment of the portable ground blind showing the frame assembly without the fabric sheet and the adjustable arms in a first position;

DETAILED DESCRIPTION

Figure 1:
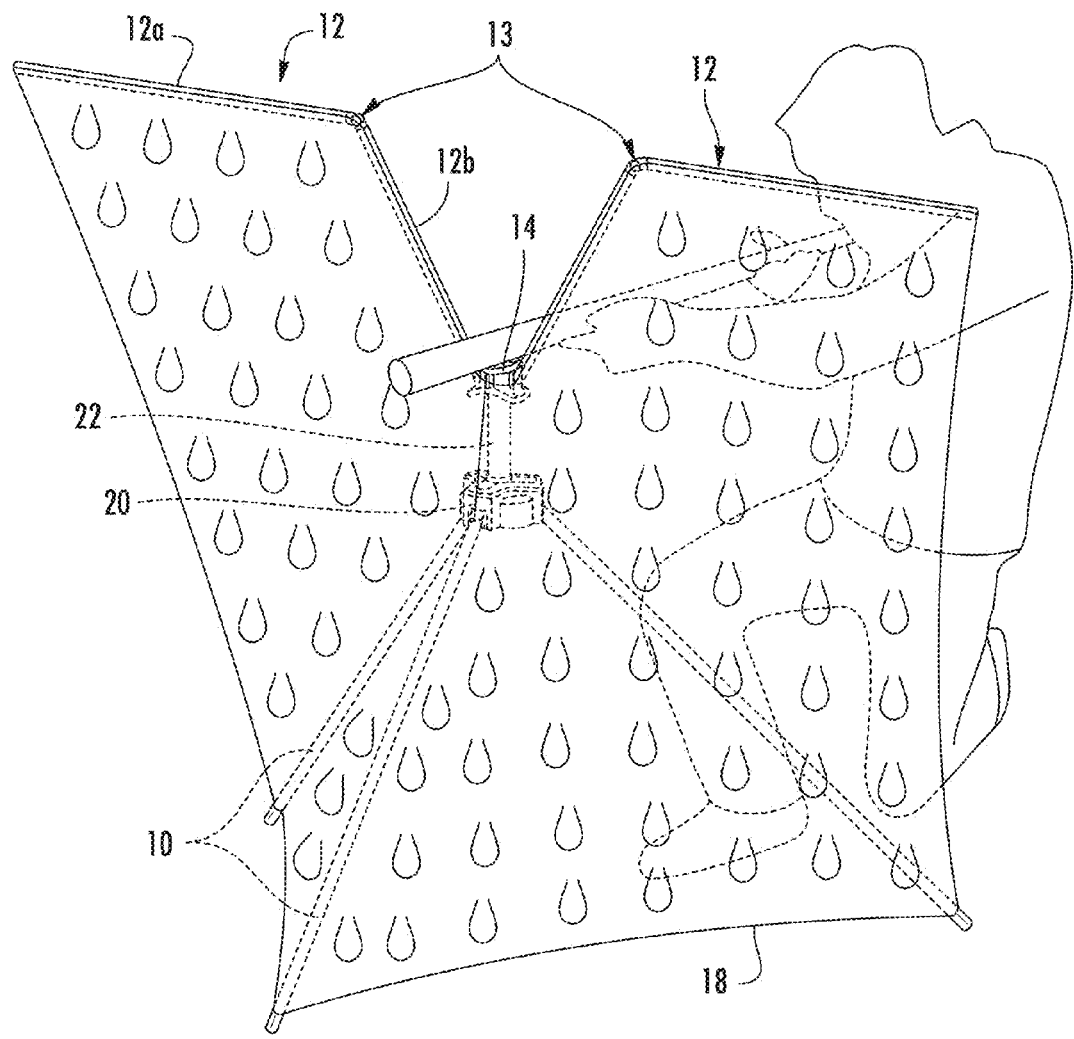
FIG. 1 is a front perspective view of an embodiment of the portable ground blind.
Figure 2:
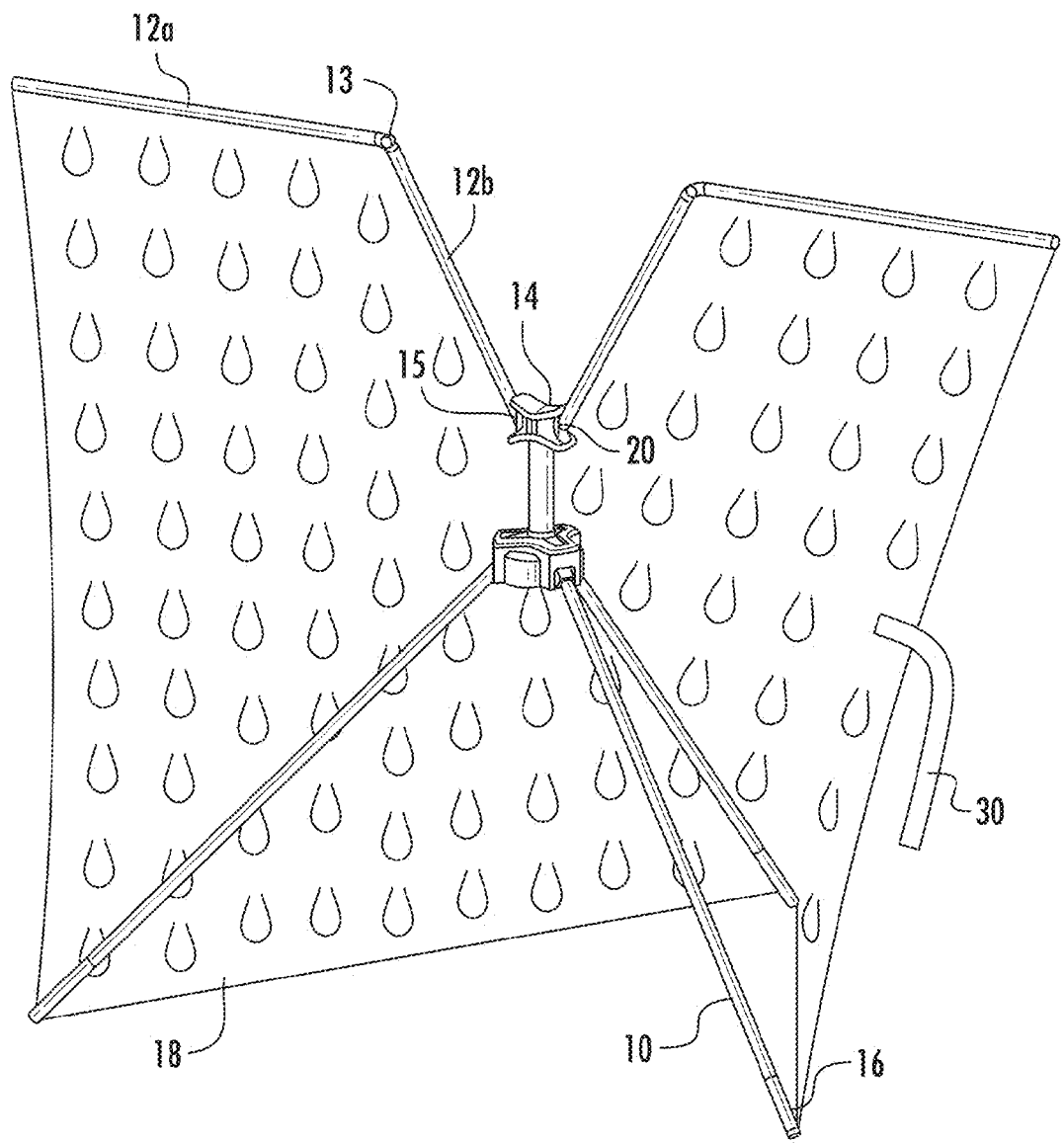
FIG. 2 is a rear perspective view of an embodiment of the portable ground blind.

FIGS. 1 and 2 generally show a portable ground blind device according to one aspect of the invention. The portable ground blind includes a sheet 18 covering a frame assembly. The sheet 18 is shown as being transparent for illustrative purposes, however, the sheet 18 is typically opaque and may include a camouflage print to help conceal the hunter behind the blind. The sheet 18 may comprise any of several types of material, such a woven fabric, plastic, or a mesh material. As shown in FIG. 1, the sheet 18 may be die cut with a pattern of slits a variety of shapes that form a plurality of flaps. For example, the slits may be in the U-shaped to form flaps that resemble leaves. The flaps can move in a windy environment to further blend the hunting blind into surrounding vegetation. The sheet 18 includes a plurality of sleeves 16 or casings adapted to receive portions of the arm members 12 and leg support members 10 to help secure the sheet 18 to the arm member 12 and leg support members 10.

The frame assembly includes a connector 20 pivotally combined with one or more leg support members 10 for supporting the device on the ground surface and one or more adjustable arm members 12 for adjusting the position of the sheet 18 relative to the frame assembly. In one embodiment the frame assembly includes three leg support members 10 which form a tripod or other non-planar support structure when they are pivoted from their retracted/collapsed position to their extended position. In their extended position the ground engaging ends of the support members 10 extend downward an outward from the connector member 20 so that the leg supports 10 have a larger cross sectional area at the ground engaging ends then they do at their top ends (i.e., they generally form a cone shape). Any number of leg support members 10 forming a non-planar support may be used including four and five, however, the invention will be described herein using an exemplary embodiment with three leg support members 10 forming a tripod in their extended position. The leg support members 10 provide stability and also allow the sheet 18 to wrap around the leg support members 10 in three dimensions, as explained in more detail below. The leg support members 10 may each articulate (independently extend and retract) to adapt to uneven ground and to raise and lower the entire blind assembly. In addition to the pivotal connection between the connector 20 and the arm members 12, the adjustable arms 12 include joints 13 which allow a single arm member 12 to have multiple sections 12a, 12b, each section can be separately adjusted relative to the frame assembly. The connector 20 may include or be combined with a gun rest 14. The gun rest 14 may be adjustably combined with the rest of the connector member 20 to adjust its elevation upward or downward relative to the rest of the frame assembly.

As shown best in FIGS. 1, 5b, 6a, and 7b, the sheet 18 is combined with and/or wraps around at least three of the leg support members 10 so that the sheet 18 covers the leg support members 10 in three dimensions. In embodiments having more than three leg support members 10, the sheet 18 is wrapped around at least three of the leg support members 10 to create a three dimensional configuration. The three dimensional configuration of the sheet 18 creates a covered pocket having walls 32, 34 (FIGS. 6a, 6b) on at least two sides which are angled relative to each other so they are not in the same plane. Attaching the sheet 18 over the top of the leg support members 10 creates a pocket under the middle leg support 10. For example, with reference to FIGS. 6a and 6b, it can be seen that the middle/center leg support 10b extends forward from the center of the frame. The other leg support members 10a, 10c extend outward on each side. The sheet 18 forms a first wall 32 by covering the space between the first leg support member 10a and the second leg support member 10b and a second wall 34 by covering the space between the second leg support member 10b and the third leg support member 10c. The space between the third leg support member 10c and the first leg support member 10a, however, is not covered by the sheet 18. This space forms an opening which faces the hunter sitting behind the blind providing the hunter with access to the covered pocket. The hunter may sit with his/her legs or body inside the pocket to help conceal him/her from the animals. In addition, the hunter may store gear or other items in the pocket out of sight from the animals, even when the animals are located off to the side of the blind (i.e., even when the animals are no longer directly in front of the blind).

Figure 6A:
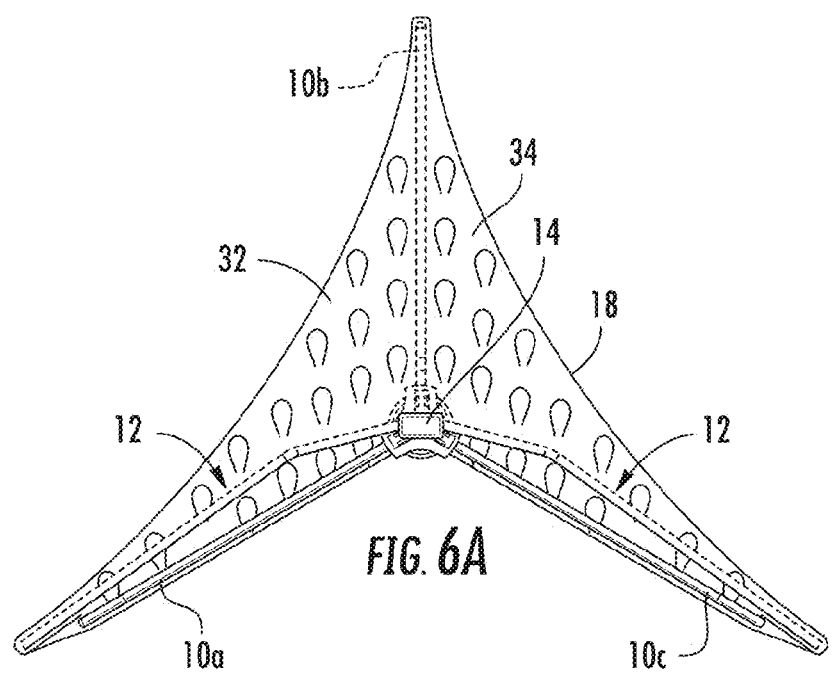
FIG. 6*a* is a top view of an embodiment of the portable ground blind showing the adjustable arms in a second position.
Figure 6B:
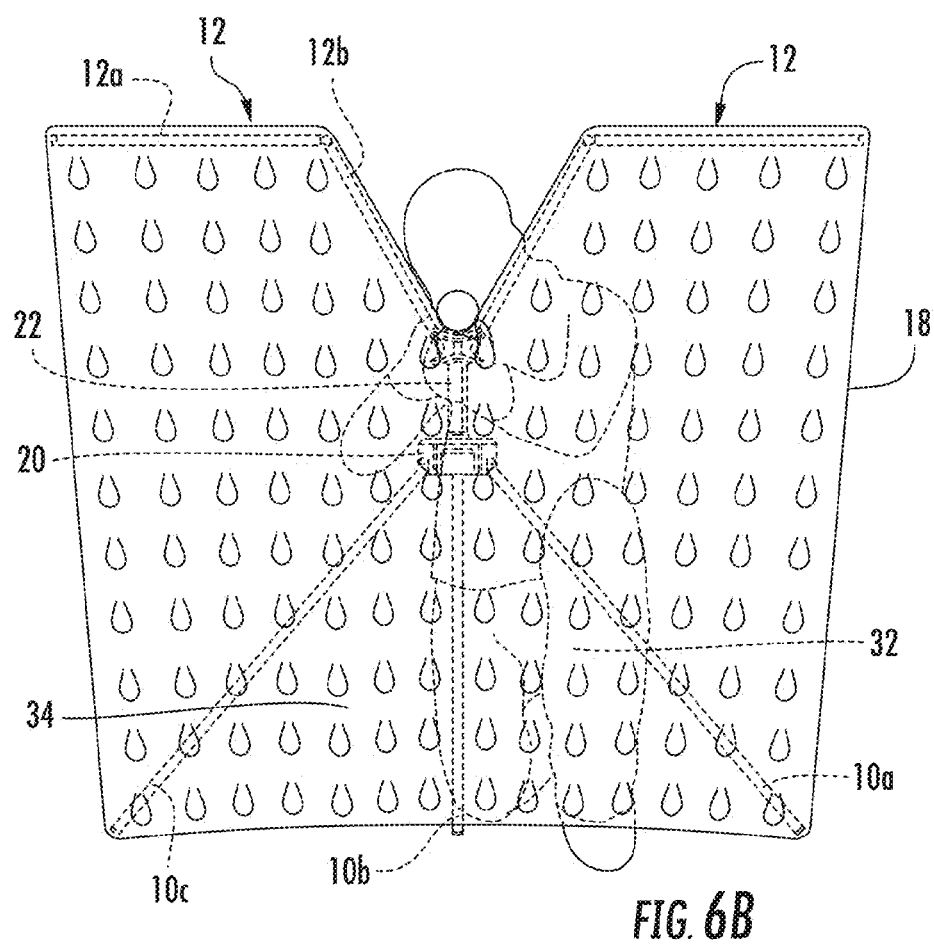
FIG. 6*b* is a front view of an embodiment of the portable ground blind showing the adjustable arms in the second position.

In one embodiment the sheet 18 is combined with all of the leg support members 10 by inserting an end of each support member 10 into sleeves 16 or casings sewn into a portion of the sheet 18. Other attachment means such as VELCRO straps or snaps may be used to attach the sheet 18 to the frame. In other embodiments the sheet 18 is combined with fewer than all of the leg support members 10. With reference to FIGS. 6a and 6b, for example, the sheet 18 may be combined with the first leg support member 10a and the third leg support member 10c to keep the sheet 18 secured on both sides, but it is not necessary to combine the sheet 18 with the second leg support member 10b.

Figure 3:
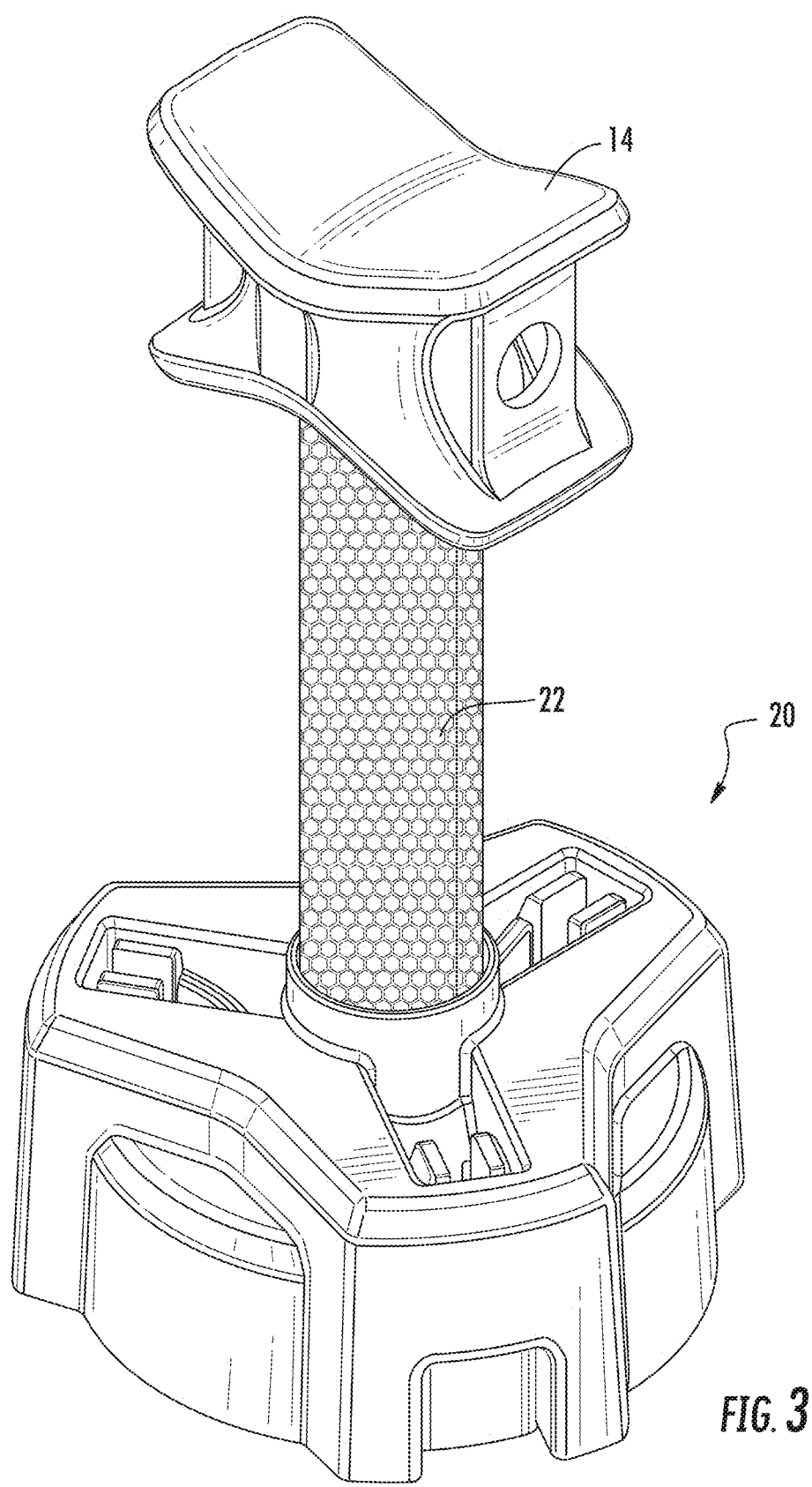
FIG. 3 is a perspective view of the connector.

FIG. 3 shows an embodiment of the connector 20 which includes a gun rest 14. The gun rest 14 may be mounted on a vertical support member 22 capable of being raised or lowered between a first position and a second position. In some embodiments the vertical support member 22 may be locked in place after being moved to its first or second position by the user.

FIGS. 4a and 4b show a detailed view of an embodiment of the pivotal connection 13 between two arm member portions 12a, 12b. This type of pivotal connection 13 may also be used between an arm member 12 and the connector 20. The pivotal connection 13 between arm member portions 12a, 12b allows each arm member 12 to pivot in at least two places, namely, at the connection between the arm member 12 and the connector 22 and also at the pivotal connection 13. In the embodiment shown, the pivotal connection 13 is an adjustable locking hub wherein each arm member 12a, 12b has an end portion rotatable about a common axis. Each end portion comprises a plurality of teeth 17 separated by a corresponding groove or socket. The teeth 17 on each arm member 12a, 12b face each other to create two opposing offset hubs combined by a tension member 11 such as a spring washer. The tension member 11 is biased in a retracted position to pull the offset hubs toward each other so that the teeth 11 from each arm member 12a, 12b are received by the socket in the other arm member 12a, 12b to form a rigid joint. Upon the application of a predetermined amount of force to rotate either of the arm members 12a, 12b, the tension member 11 stretches to an extended position wherein the offset hubs are allowed to rotate relative to each other thereby allowing the arm members 12a, 12b to move relative to one another. The pivotal connection 13 between arm members 12a, 12b allows the user to quickly and easily adjust the position and configuration of the blind.

As described above, the pivotal connection 13 shown in FIGS. 4a and 4b allows the arm members 12a, 12b to rotate relative to each other or an arm member 12 to rotate relative to the connector 22 around a single axis and through a single plane. In some embodiments an alternate pivotal connection is used which includes an additional connector 13 joint allowing the arm members 12 to move around more than one axis of rotation. This type of pivotal connection can be seen, for example, in FIGS. 4c and 6a. FIG. 4c shows two connectors 13 spaced apart and offset so each pivots about a different axis and through a different plane. In the embodiment shown, the pivot axis of the connectors 13 are offset about ninety degrees allowing arm member 12a to pivot about a first axis through a first plane and arm member 12b to pivot about a second axis through a second plane that is perpendicular to the first plane. FIG. 6a shows use of this connection between arm member 12b and the connector 22 wherein arm member 12b is pivoted upward and also rearward from the connector 22. In some embodiments a ball and socket connector may be used for this type of connection thereby allowing the components to adjust relative to each other in nearly unlimited number of orientations.

Figure 5B:
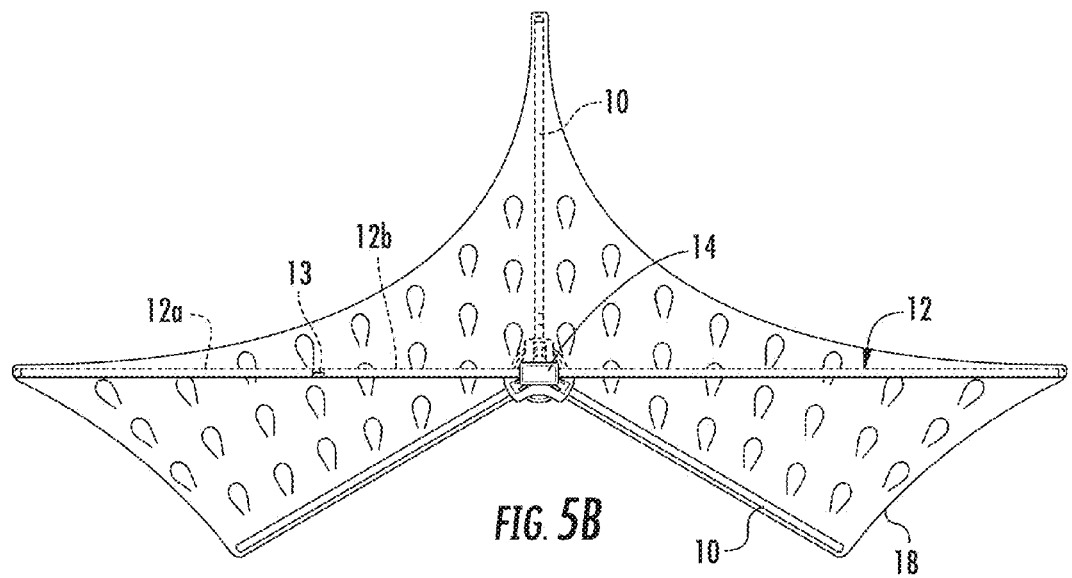
FIG. 5*b* is a top view of an embodiment of the portable ground blind showing the adjustable arms in the first position.
Figure 5C:
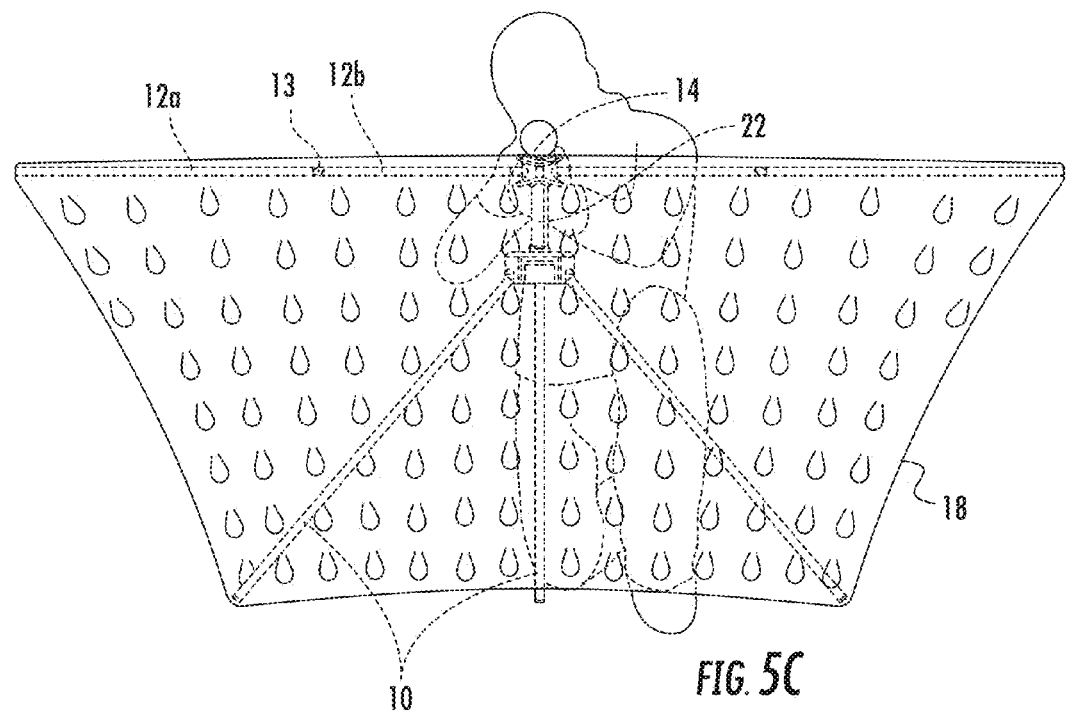
FIG. 5*c* is a front view of an embodiment of the portable ground blind showing the adjustable arms in the first position.

FIGS. 5a-5c show a configuration wherein the arm members 12 are horizontally aligned with the connector 20. In other words, arm member second portion 12b extends outward from the connector 20 in a generally horizontal orientation and arm member first portion 12a extends outward from arm member second portion 12b in a generally horizontal orientation so that the arm members 12 form a straight, generally horizontal, line.

FIGS. 6a and 6b show a second configuration where the arm members 12 have been pivoted to a different position. As shown in FIG. 6a, the arm member second portion 12b has been pivoted upward and backward (toward the user) from the connector 20 and arm member first portion 12a has been pivoted relative to arm member second portion 12b to a generally horizontal position. Pivoting the arm member second portion 12b upward relative to the connector 20 creates a viewing/shooting window between the two arm members 12. In one embodiment each arm member second portion 12b is pivoted between about 30 to 75 degrees relative to horizontal.

Figure 7A:
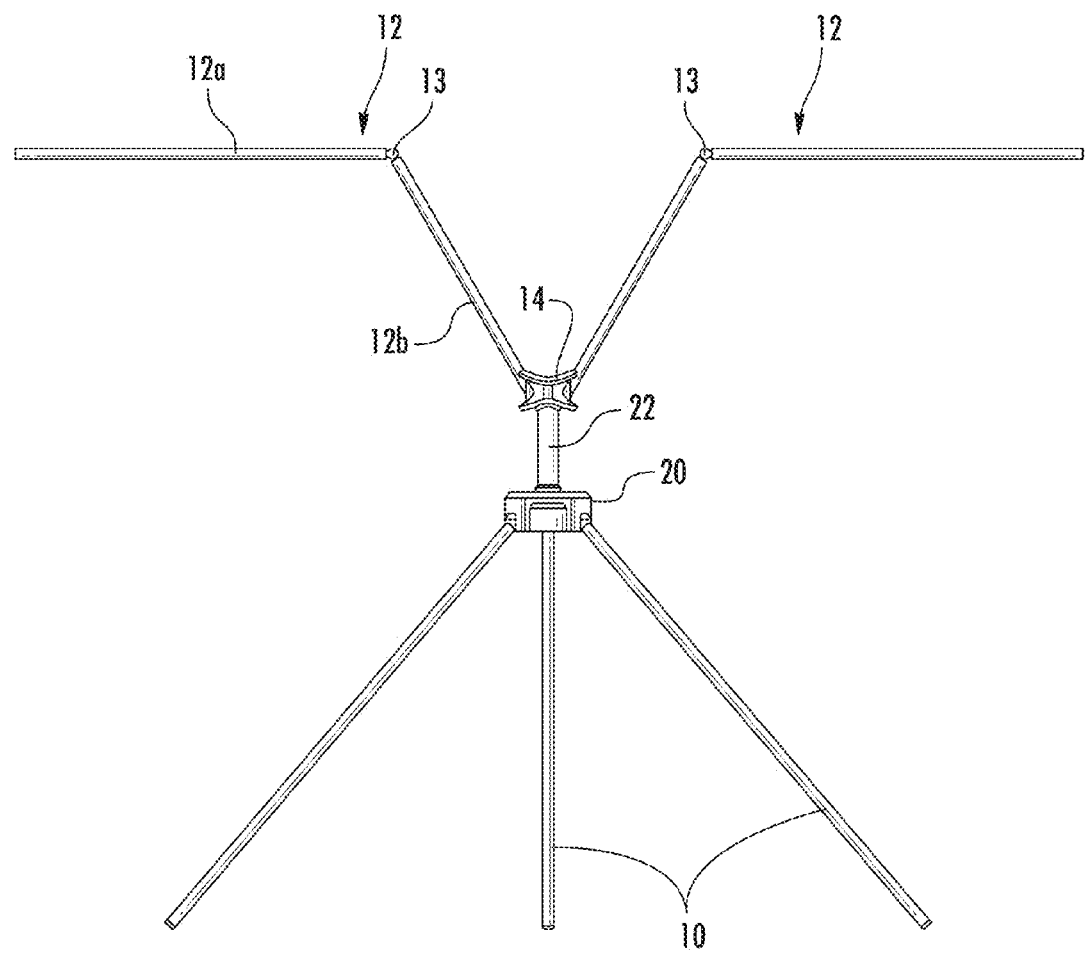
FIG. 7*a* is an elevational view of an embodiment of the portable ground blind showing the frame assembly without the fabric sheet and the adjustable arms in a third position.
Figure 7B:
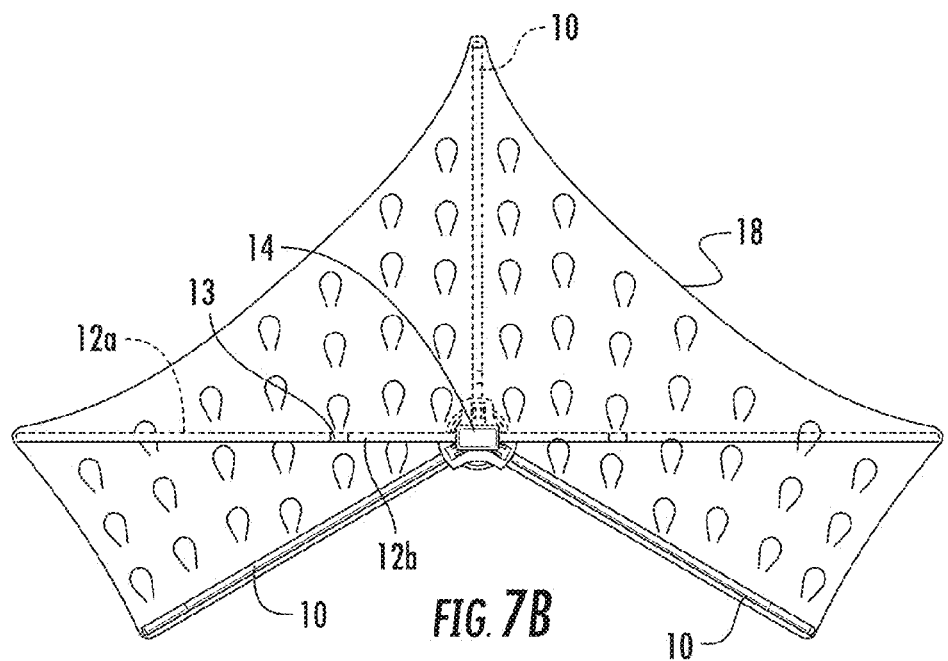
FIG. 7*b* is a top view of an embodiment of the portable ground blind showing the adjustable arms in the third position.
Figure 7C:
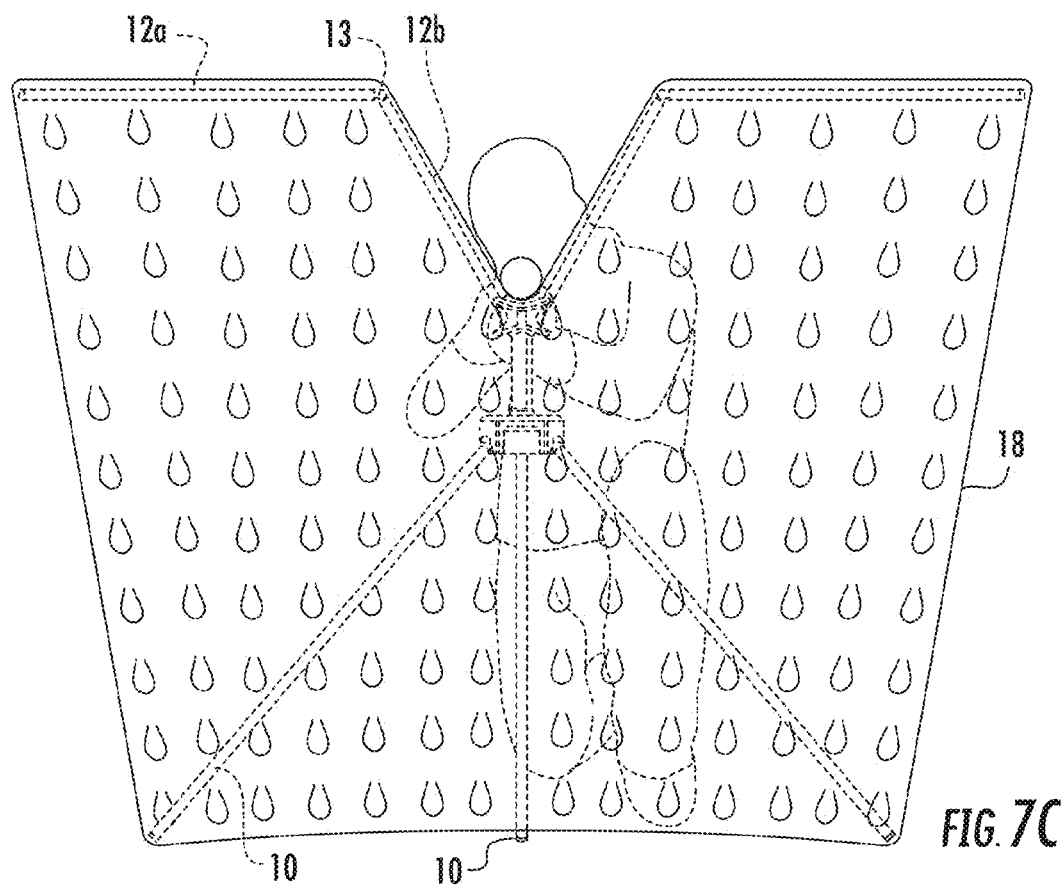
FIG. 7*c* is a front view of an embodiment of the portable ground blind showing the adjustable arms in the third position.

FIGS. 7a-7c show a third configuration where the arm members 12 have been pivoted to yet another position. In this configuration arm member second portion 12b has been pivoted upward from the connector 20, but not backward. Arm member first portion 12a has been pivoted relative to arm member second portion 12b to a generally horizontal position.

Figure 8:
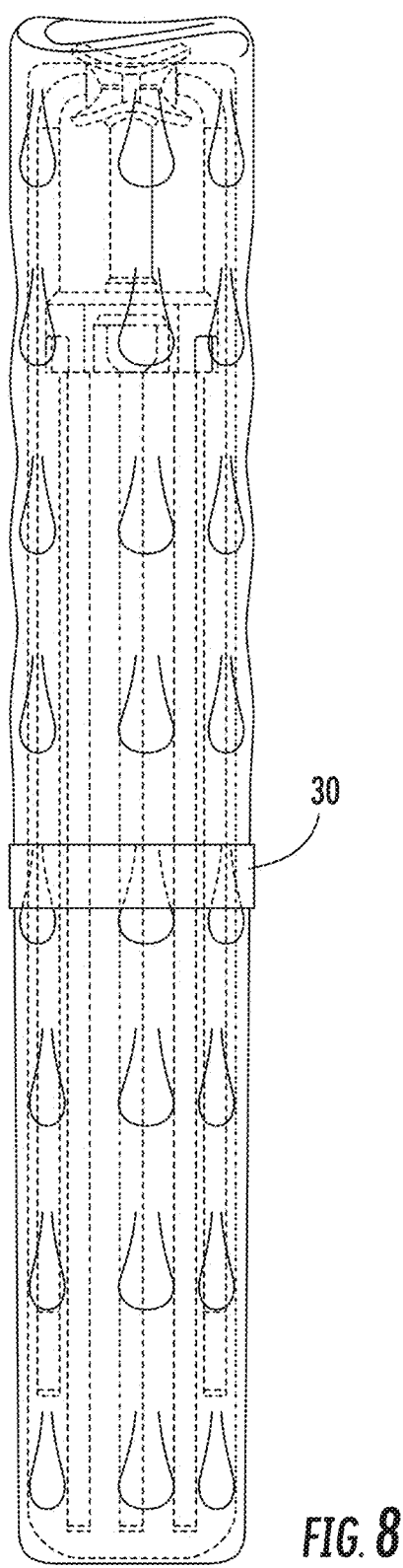
FIG. 8 is a side view of the portable ground blind in its collapsed configuration.

The sheet 18 does not necessarily stretch taut in each configuration. For example, the sheet 18 is raised higher off of the ground in the configuration shown in FIG. 6b compared with the configuration shown in FIG. 5c. However, the sheet 18 is wider in FIG. 5c than the configuration shown in FIG. 6b. FIG. 8 shows the blind in its collapsed configuration wherein the leg supports 10 have been pivoted from their extended position to their retracted position and the arm members 12 have been pivoted downward to nest with the leg supports 10. The sheet 18 may be gathered against or wrapped around the frame and a strap 30 may be used to secure the frame in its collapsed configuration for transport and storage.

Another aspect of the invention includes a method of using the portable ground blind device described above. The method includes pivoting the support members 10 outward to form a stable non-planar support for the device. In some embodiments the support members 10 may form a tripod. The support members 10 and arm members 12 are inserted into sleeves 16 or casings in the sheet 18 to attach the frame to the sheet 18. The arm members 12 and gun rest 14 are adjusted to the desired position then the user positions himself/herself behind the blind. When the hunter desires to change locations or otherwise pack up the blind, the support members 10 are moved to their retracted position and the arm members 12 are pivoted downward in general alignment with the support members 10. The sheet 18 may be gathered against or wrapped around the frame and a strap 30 may be used to secure the frame in its collapsed configuration for transport and storage as shown in FIG. 8.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. A hunting blind comprising:
    a frame having a connector, leg supports, and arm members, wherein the leg supports are pivotally combined with a first portion of the connector and the arm members are pivotally combined with a second portion of the connector; and
    a sheet coupled to the frame and forming a first wall between a first leg support and a second leg support of the leg supports, and forming a second wall between the second leg support and a third leg support of the leg supports,
    wherein at least one arm member of the arm members includes a pivotal arm connector to pivotally coupled to an arm member first portion and an arm member second portion of the at least one arm member.

2. The hunting blind of claim 1, wherein the connector includes a gun rest.

3. The hunting blind of claim 2, wherein the second portion of the connector is the gun rest.

4. The hunting blind of claim 1, wherein the pivotal arm connector comprises an adjustable locking hub.

5. The hunting blind of claim 1, wherein the pivotal arm connector comprises:
    a first connector combined with the arm member first portion adapted to pivot about a first axis; and
    a second connector spaced from the first connector and combined with the arm member second portion adapted to pivot about a second axis.

6. The hunting blind of claim 1, wherein the sheet is opaque.

7. The hunting blind of claim 1, wherein the sheet is coupled to the leg supports and the arm members.

8. The hunting blind of claim 1, wherein the sheet is further coupled to the arm member first portion and the arm member second portion.

9. The hunting blind of claim 1, wherein the sheet includes casings adapted to receive the leg supports and arm members.

10. A hunting blind comprising:
    a frame having a connector combined with arm members and at least three leg supports, wherein the at least three leg supports include a first leg support, a second leg support, and a third leg support; and
    a sheet forming a first wall between the first leg support and the second leg support and a second wall between the second leg support and the third leg support.

11. The hunting blind of claim 10, wherein the sheet is coupled to each of the at least three leg supports.

12. The hunting blind of claim 11, wherein the sheet is further coupled to the arm members.

13. The hunting blind of claim 11, wherein the at least three leg supports are pivotally combined with a first portion of the connector and the arm members are pivotally combined with a second portion of the connector.

14. The hunting blind of claim 10, wherein the at least three leg supports form a tripod.

15. The hunting blind of claim 10, wherein the at least three leg supports have a retracted position and an extended position, and wherein the at least three leg supports form a tripod in their extended position.

16. The hunting blind of claim 15, wherein the first wall and the second wall form a three dimensional covered pocket when the leg supports are in their extended position.

17. A hunting blind comprising:
   a frame having a connector, at least three leg supports including a first leg support, second leg support, and a third leg support, and arm members, wherein the at least three leg supports are pivotally combined with a first portion of the connector and the arm members are pivotally combined with a second portion of the connector; and
   a sheet forming a first wall between the first leg support and the second leg support and a second wall between the second leg support and the third leg support,
   wherein at least one arm member of the arm members includes a pivotal arm connector to pivotally coupled to an arm member first portion and an arm member second portion of the at least one arm member.

18. The hunting blind of claim 17, wherein the second portion of the connector comprises a gun rest.

19. The hunting blind of claim 17, wherein the pivotal arm connector is an adjustable locking hub.

20. The hunting blind of claim 17, wherein the at least three leg supports have a retracted position and an extended position, and wherein the at least three leg supports form a tripod in their extended position.

21. The hunting blind of claim 20, wherein the first wall and the second wall form a three dimensional covered pocket when the leg supports are in their extended position.

* * * * *